(12) United States Patent
Dai et al.

(10) Patent No.: US 10,623,999 B2
(45) Date of Patent: Apr. 14, 2020

(54) DATA TRANSMISSION METHOD AND APPARATUS

(71) Applicant: ZTE CORPORATION, Shenzhen, Guangdong Province (CN)

(72) Inventors: Bo Dai, Shenzhen (CN); Shuqiang Xia, Shenzhen (CN); Qian Dai, Shenzhen (CN); Jing Shi, Shenzhen (CN); Liujun Hu, Shenzhen (CN); Zhaohua Lu, Shenzhen (CN)

(73) Assignee: ZTE CORPORATION (CN)

( * ) Notice: Subject to any disclaimer, the term of this patent is extended or adjusted under 35 U.S.C. 154(b) by 124 days.

(21) Appl. No.: 15/304,121

(22) PCT Filed: Jul. 24, 2014

(86) PCT No.: PCT/CN2014/082875
§ 371 (c)(1),
(2) Date: Oct. 14, 2016

(87) PCT Pub. No.: WO2015/158056
PCT Pub. Date: Oct. 22, 2015

(65) Prior Publication Data
US 2017/0041829 A1    Feb. 9, 2017

(30) Foreign Application Priority Data

Apr. 16, 2014 (CN) .......................... 2014 1 0153277

(51) Int. Cl.
*H04W 28/22* (2009.01)
*H04W 28/06* (2009.01)
(Continued)

(52) U.S. Cl.
CPC ........... *H04W 28/22* (2013.01); *H04L 5/0044* (2013.01); *H04L 5/0091* (2013.01); *H04W 28/06* (2013.01);
(Continued)

(58) Field of Classification Search
CPC ... H04L 5/1438; H04L 1/0001; H04L 1/0023; H04L 1/20; H04L 5/006; H04L 5/0092
See application file for complete search history.

(56) References Cited

U.S. PATENT DOCUMENTS

2004/0240535 A1* 12/2004 Verma ................... H04L 1/0023
375/222
2005/0130665 A1    6/2005 Laroia et al.
(Continued)

FOREIGN PATENT DOCUMENTS

CN    101383795 A    3/2009
CN    101682417      3/2010
(Continued)

OTHER PUBLICATIONS

Office Action dated Nov. 7, 2017 for Japanese Patent Application No. 2016-562859.
(Continued)

*Primary Examiner* — Ayaz R Sheikh
*Assistant Examiner* — Debebe A Asefa
(74) *Attorney, Agent, or Firm* — McDonald Hopkins LLC

(57) ABSTRACT

Disclosed are a data transmission method and apparatus. The method includes: a transmission node acquiring information about a data transmission mode, herein the information about the data transmission mode includes a rapid data transmission mode in which a time-domain length of data transmission is configured based on a time-domain symbol; and the transmission node transmitting data according to the acquired data transmission mode. In the data transmission method, the time-domain length of data transmission is configured based on the time-domain symbol, the setting of the time-domain length of data transmission is flexible, multiple opportunities of data transmission can exist in one subframe, resources used for data transmission can be guaranteed to be found rapidly when there is a data transmission
(Continued)

demand, thus rapid data transmission is realized and data transmission delay is reduced.

34 Claims, 5 Drawing Sheets

(51) Int. Cl.
*H04L 5/00* (2006.01)
*H04L 27/26* (2006.01)

(52) U.S. Cl.
CPC ........ *H04L 5/0053* (2013.01); *H04L 27/2601* (2013.01)

(56) References Cited

U.S. PATENT DOCUMENTS

| | | | |
|---|---|---|---|
| 2006/0087961 A1* | 4/2006 | Chang | H04L 27/2607 370/203 |
| 2008/0279143 A1 | 11/2008 | Lee et al. | |
| 2009/0122901 A1* | 5/2009 | Choi | H04L 5/0007 375/267 |
| 2010/0284339 A1 | 11/2010 | Noh et al. | |
| 2012/0220327 A1* | 8/2012 | Lee | H04W 72/1273 455/509 |

FOREIGN PATENT DOCUMENTS

| | | |
|---|---|---|
| CN | 101924721 | 12/2010 |
| CN | 101924721 A | 12/2010 |
| CN | 1025955604 A | 7/2012 |
| JP | 2010526510 A | 7/2010 |
| JP | 2013207384 A | 10/2013 |
| WO | 2015148076 A1 | 10/2015 |

OTHER PUBLICATIONS

International Search Report and Written Opinion dated Jan. 21, 2015 in PCT Application No. PCT/CN2014/082875.
Extended European Search Report dated Mar. 6, 2017 for European Patent Application No. EP14889559.2.
IPWireless: "Operation of the OFDMA DL and SC-FDMA/ OFDMA UL in unpaired spectrum according to coexistence approach 2", 3GPP Draft; R1-051537, 3rd Generation Partnership Project (3GPP), Mobile Competence Centre ; 650, Route Des Lucioles; F-06921 Sophia-Antipolis Cedex; France, vol. RAN WG1. No. Seoul, Korea; Nov. 1, 2005, Nov. 1, 2005, XP050101110.

* cited by examiner

DATA TRANSMISSION METHOD AND APPARATUS

CROSS-REFERENCE TO RELATED APPLICATION(S)

This application is the U.S. National Phase application of PCT application number PCT/CN2014/082875 having a PCT filing date of Jul. 24, 2014, which claims priority of Chinese patent application 201410153277.8 filed on Apr. 16, 2014, the disclosures of which are hereby incorporated by reference.

TECHNICAL FIELD

The present document relates to a mobile communication technology, in particular to a dynamic data transmission method and apparatus based on a time-domain symbol.

BACKGROUND OF RELATED ART

With the increasing perfection of commercial use of a Long-Term Evolution (LTE)/Long-Term Evolution Advanced (LTE-Advanced/LTE-A) system of the 4th Generation (4G) mobile communication technology, technical index requirements on the next generation mobile communication technology, i.e., the 5th Generation (5G) mobile communication technology are higher and higher. The industry generally believes that the next generation mobile communication system should have features such as ultra-high speed, ultrahigh capacity, ultrahigh reliability and ultralow delay transmission feature.

FIG. 1 is a schematic diagram of delay transmission features in existing different generation mobile communication technologies. As illustrated in FIG. 1, horizontal ordinates express delay demands and longitudinal coordinates express different generation mobile communication systems. As illustrated in FIG. 1, a delay of data transmission in a traditional system of the 2nd Generation (2G) mobile communication technology exceeds 100 ms, and this delay can reach a low delay communication effect in the aspect of human body muscle response; a delay of data transmission in a system of the 3rd Generation (3G) mobile communication technology is 100 ms, and this delay can reach a low delay communication effect in the aspect of hearing; and a delay of data transmission in a 4G system is about 20 ms, and this delay can reach a low delay communication effect in the aspect of vision.

However, technologies for implementing delay transmission in each generation mobile communication technology cannot satisfy ultralow delay communication requirements in application scenarios such as mobile 3D targets, virtual reality, intelligent transportation and intelligent power grids. These application scenarios require that a data delay with a magnitude of 1 ms can be realized.

In an existing LTE system, a physical downlink control channel is located on first n Orthogonal Frequency Division Multiplexing (OFDM) symbols of a subframe, and a Physical Downlink Share Channel (PDSCH) is located after a Physical Downlink Control Channel (PDCCH) time domain and occupies the entire subframe in the time domain. In addition, an enhanced Physical Downlink Control Channel (ePDCCH) and a physical downlink share channel use a frequency division multiplexing mode, and time-domain lengths are the same, as illustrated in FIG. 2 which is a schematic diagram of a physical downlink control channel and a physical downlink share channel in an existing LTE system. In FIG. 2, in a subframe, an oblique line shaded part expresses a PDCCH region, an oblique small check shaded part expresses an ePDCCH region and a black part expresses a PDSCH region.

Generally, only after user equipment receives a PDCCH/ePDCCH, a PDSCH frequency-domain position can be known and corresponding data decoding is started to implement data transmission. Thus, in one aspect, if the PDCCH/ePDCCH receiving is delayed, thus decoding of data born by the PHSCH will be delayed; and in the other aspect, since an interval of PDCCH/ePDCCH/PDSCH transmission in the LTE system is one subframe, even though there is burst super real-time data transmission, processing can be performed by waiting for the incoming of a next subframe and this data transmission mode increases data transmission delay.

In addition, since the time-domain length is fixed, i.e., the entire subframe is occupied in time domain, a frequency-domain position of data transmission can only be adjusted. As a result, for a small data packet scenario that data transmission can be completed through a single OFDM symbol or a plurality of OFDM symbols, data transmission can only be completed in a delay of one subframe, this undoubtedly also increases data transmission delay and consequently rapid transmission of data is hindered.

SUMMARY

In order to solve the above-mentioned technical problem, the embodiments of the present document provide a data transmission method and apparatus, which can decrease data transmission delay, satisfy transmission delay requirements under specific application scenarios and thus realize rapid transmission of data.

A data transmission method includes: a transmission node acquiring information about a data transmission mode, herein the information about the data transmission mode includes a rapid data transmission mode, the rapid data transmission mode includes: configuring a time-domain length of data transmission based on a time-domain symbol; and the transmission node transmitting data according to the acquired data transmission mode.

Optionally, the transmission node includes a sending node and the sending node only supports the rapid data transmission mode.

Optionally, the transmission node includes a sending node and a receiving node, and when the sending node not only supports the rapid data transmission mode, but also supports a conventional data transmission mode, the method further includes:

the sending node determining whether the receiving node uses the rapid data transmission mode; and when determining that the receiving node uses the rapid data transmission mode, sending the information about the data transmission node to the receiving node to indicate that the data transmission mode of the receiving node is the rapid data transmission mode.

Optionally, determining whether the receiving node uses the rapid data transmission mode includes:

determining whether the receiving node uses the rapid data transmission mode according to preset transmission information of the receiving node.

Optionally, the preset transmission information of the receiving node at least includes at least one of the following: transmission mode request information, device type information and service type information.

Optionally, determining whether the receiving node uses the rapid data transmission mode includes:

if the sending node receives transmission mode request information from the receiving node, the sending node determining that the receiving node uses the rapid data transmission mode; or if the sending node determines that a type of the receiving node is a device supporting rapid data transmission according to device type information of the receiving node, the sending node determining that the receiving node uses the rapid data transmission mode; or if the sending node determines that a service type of the receiving node includes an ultralow delay service and/or data demanded by a small resource block according to service type information of the receiving node, the sending node determining that the receiving node uses the rapid data transmission mode; or if the sending node determines that a receiving device is a device supporting rapid data transmission according to device type information of the receiving node and determines that the receiving device is of a service type using rapid data transmission according to a service type of the receiving device, the sending node determining that the receiving node uses the rapid data transmission mode.

Optionally, the transmission node includes a sending node and a receiving node, and if the sending node determines that the receiving node simultaneously uses the rapid data transmission mode and the conventional data transmission mode, the method further includes: the sending node setting the receiving node to simultaneously use the rapid data transmission mode and the conventional data transmission mode.

Optionally, the rapid data transmission mode and the conventional data transmission mode of the receiving node are located in different serving cells, or are located on different subframes of a same serving cell, or are located on different time-domain symbols of a same subframe of a same serving cell.

Optionally, when the receiving node simultaneously supports the rapid data transmission mode and the conventional data transmission mode, the method includes at least one of the following:

a primary serving cell of the receiving node using the conventional data transmission mode, and a secondary serving cell of the receiving node using the rapid data transmission mode;

the primary serving cell of the receiving node using the conventional data transmission mode and a dedicated serving cell of the receiving node using the rapid data transmission mode; different subframe sets of a same serving cell of the receiving node using different transmission modes; and different time-domain symbols of a same subframe of a same serving cell of the receiving node using different transmission modes.

Optionally, the transmission node includes a sending node and a receiving node; and acquiring the information about the data transmission mode includes:

an upper node in a transmission network sending the information about the data transmission mode to the sending node before the data transmission, and the sending node sending the information about the data transmission mode to the receiving node; or the sending node sending the information about the data transmission mode to the receiving node before the sending node sends data when the receiving node needs to perform data transmission; or the sending node sending the information about the data transmission mode in control information corresponding to data when the receiving node needs to perform data transmission; or dynamically determining the information about the data transmission mode according to data information which needs to be transmitted when data transmission is performed between the sending node and the receiving node.

Optionally, the time-domain symbol at least includes: an Orthogonal Frequency Division Multiplexing (OFDM) symbol, or a Single Carrier Frequency Division Multiple Access (SC-FDMA) symbol, or a non-orthogonal symbol.

Optionally, the time-domain length includes h time-domain symbols, and h is a preset numerical value, or a number of time-domain symbols contained in a time slot, or a number of time-domain symbols contained in a subframe, or a number of all or partial time-domain symbols contained in a plurality of subframes.

Optionally, the number of the time-domain symbols for transmitting data in the time-domain length is preset; or the number of the time-domain symbols is dynamically determined according to data information such as a size of a data packet which needs to be transmitted.

Optionally, a determining mode of a time-domain region of the time-domain symbols in the subframe is:

determining a time-domain starting position of the time-domain symbols according to position information designated by sent signaling;

or a time-domain starting position of the time-domain symbols being the same as a time-domain starting position of a downlink control channel related to data, or determining a time-domain starting position of the time-domain symbols according to a time-domain starting position of a control channel related to data.

Optionally, a relationship between the data channel and a corresponding control channel is that:

time-domain symbols of the data channel and time-domain symbols of the corresponding control channel have a same time-domain starting position and time-domain ending position; or a time-domain starting position of time-domain symbols of the data channel is next to a time-domain ending position of time-domain symbols of the corresponding control channel of the data channel, and at this moment, the data channel and the corresponding control channel of the data channel have same frequency-domain positions, or the two have different or partially same frequency-domain positions; or time-domain symbols of the data channel and time-domain symbols of the corresponding control channel of the data channel have a same time-domain starting position, and a time-domain length of the data channel is greater than or equal to a time-domain length of the control channel, and the time-domain length of the data channel may be preset, or indicated by signaling from the sending node or determined according to the time-domain length of the control channel, or there is a preset mapping relationship between the time-domain length of the data channel and the time-domain length of the control channel; or time-domain positions of time-domain symbols of the data channel are determined according to signaling born by the control channel corresponding to the data channel, and a time-domain starting position of time-domain symbols of the data channel is earlier or later than or the same as a time-domain starting position of time-domain symbols of the control channel; or a time-domain starting position of time-domain symbols of the data channel is set according to the time-domain length of the data channel, and a time-domain symbol region of the control channel is located at a preset position in a time-domain length region of the data channel; or a time-domain length region position of the data channel and a time-domain length region position of the control channel have a preset interval t.

Optionally, frequency-domain positions of the data channel and the corresponding control channel of the data channel are respectively determined, and the frequency-domain positions of the data channel are determined according to resource indication signaling born by the control channel.

Optionally, frequency-domain positions of the data channel and the corresponding control channel are discontinuous.

Optionally, the data channel and the corresponding control channel of the data channel include: a downlink data channel and a corresponding downlink control channel of the downlink data channel, and/or an uplink data channel and a corresponding uplink control channel of the uplink data channel; and if the uplink data channel uses autonomous scheduling, the uplink control channel is used for indicating related transmission information of the corresponding data channel.

Optionally, transmitting the data according to the data transmission mode includes:

transmitting uplink data and a corresponding control channel of the uplink data according to the data transmission mode, and/or transmitting downlink data and a corresponding control channel of the downlink data according to the data transmission mode, herein the uplink data are born through an uplink data channel, uplink control information is born through an uplink control channel and the transmission includes sending and/or receiving.

Optionally, the sending node includes a base station, a relay transmission node, a wireless gateway or a router; and the receiving node includes user equipment, a micro base station or a home base station.

The embodiment of the present document further provides a data transmission system, at least including a transmission node, the transmission node is configured to acquire information about a data transmission mode and transmit data according to the acquired data transmission mode, and the information about the data transmission mode includes a rapid data transmission mode, the rapid data transmission mode including: configuring a time-domain length of data transmission based on a time-domain symbol.

Optionally, the transmission node includes a sending node and the sending node only supports the rapid data transmission mode.

Optionally, the transmission node includes a sending node and a receiving node, and when the sending node not only supports the rapid data transmission mode, but also supports a conventional data transmission mode, the sending node is further configured to determine whether the receiving node uses the rapid data transmission mode according to preset transmission information of the receiving node, and when determining that the receiving node uses the rapid data transmission mode, send the information about the data transmission mode to the receiving node to indicate that the data transmission mode of the receiving node is the rapid data transmission mode; and the receiving node is further configured to transmit data by using the rapid data transmission mode according to the indication of the sending node.

Optionally, the sending node is further configured to, when determining that the receiving node does not support the rapid data transmission mode, determine that the receiving node transmits data according to the conventional data transmission mode; and the receiving node is further configured to transmit data by using the conventional data transmission mode according to the indication of the sending node.

Optionally, the sending node is further configured to, when determining that the receiving node simultaneously supports the rapid data transmission mode and the conventional data transmission mode, set the receiving node to simultaneously support the rapid data transmission mode and the conventional data transmission mode; and the receiving node is further configured to perform data transmission in the rapid data transmission mode and/or the conventional data transmission mode according to setting of the sending node.

Optionally, the sending node includes a base station, a relay transmission node, a wireless gateway or a router; and the receiving node includes user equipment, a micro base station or a home base station.

Optionally, the time-domain symbol at least includes: an Orthogonal Frequency Division Multiplexing (OFDM) symbol, or a Single Carrier Frequency Division Multiple Access (SC-FDMA) symbol, or a non-orthogonal symbol.

Optionally, the time-domain length includes h time-domain symbols, and h is a preset numerical value, or a number of time-domain symbols contained in a time slot, or a number of time-domain symbols contained in a subframe, or a number of all or partial time-domain symbols contained in a plurality of subframes.

Optionally, the number of the time-domain symbols for transmitting data in the time-domain length is preset; or the number of the time-domain symbols is dynamically determined according to data information such as a size of a data packet which needs to be transmitted.

Optionally, a determining mode of a time-domain region of the time-domain symbols in the subframe is:

determining a time-domain starting position of the time-domain symbols according to position information designated by sent signaling;

or a time-domain starting position of the time-domain symbols being the same as a time-domain starting position of a downlink control channel related to data, or determining a time-domain starting position of the time-domain symbols according to a time-domain starting position of a control channel related to data.

Optionally, a relationship between the data channel and a corresponding control channel is that:

time-domain symbols of the data channel and time-domain symbols of the corresponding control channel have a same time-domain starting position and time-domain ending position; or a time-domain starting position of time-domain symbols of the data channel is next to a time-domain ending position of time-domain symbols of the corresponding control channel of the data channel, and at this moment, the data channel and the corresponding control channel of the data channel have same frequency-domain positions, or the two have different or partially same frequency-domain positions; or time-domain symbols of the data channel and time-domain symbols of the corresponding control channel of the data channel have a same time-domain starting position and a time-domain length of the data channel is greater than or equal to a time-domain length of the control channel, and the time-domain length of the data channel may be preset, or indicated by signaling from the sending node or determined according to the time-domain length of the control channels, or there is a preset mapping relationship between the time-domain length of the data channel and the time-domain length of the control channel; or time-domain positions of time-domain symbols of the data channel are determined according to signaling born by the control channel corresponding to the data channel, and a time-domain starting position of time-domain symbols of the data channel is earlier or later than or the same as a time-domain starting position of time-domain symbols of the control channel; or a time-domain starting position of time-domain symbols of the data channel is set according to the time-domain length of the data channel, and a time-domain symbol region of the control channel is located at a preset position in a time-domain length region of the data channel; or a time-domain length region position of the data channel and a time-domain length region position of the control channel have a preset interval t.

Optionally, frequency-domain positions of the data channel and the corresponding control channel are discontinuous.

The embodiment of the present document further provides a sending node, configured to acquire information about a data transmission mode and transmit data according to the acquired data transmission mode, and the information about the data transmission mode includes a rapid data transmission mode, the rapid data transmission mode includes: configuring a time-domain length of data transmission based on a time-domain symbol.

Optionally, the sending node only supports the rapid data transmission mode.

Optionally, when the sending node not only supports the rapid data transmission mode, but also supports a conventional data transmission mode, the sending node is further configured to determine whether a receiving node supports the rapid data transmission mode according to preset transmission information of the receiving node, and when determining that the receiving node uses the rapid data transmission mode, send the information about the data transmission mode to the receiving node to indicate that the data transmission mode of the receiving node is the rapid data transmission mode; and the preset transmission information of the receiving node at least includes at least one of the following: transmission mode request information, device type information and service type information.

Optionally, the sending node is further configured to, when determining that the receiving node does not support the rapid data transmission mode, determine that the receiving node transmits data according to the conventional data transmission mode.

Optionally, the sending node is further configured to, when determining that the receiving node simultaneously supports the rapid data transmission mode and the conventional data transmission mode, set the receiving node to simultaneously support the rapid data transmission mode and the conventional data transmission mode.

Optionally, the sending node includes a base station, a relay transmission node, a wireless gateway or a router.

Optionally, the time-domain symbol at least includes: an Orthogonal Frequency Division Multiplexing (OFDM) symbol, or a Single Carrier Frequency Division Multiple Access (SC-FDMA) symbol, or a non-orthogonal symbol.

Optionally, the time-domain length includes h time-domain symbols, and h is a preset numerical value, or a number of time-domain symbols contained in a time slot, or a number of time-domain symbols contained in a subframe, or a number of all or partial time-domain symbols contained in a plurality of subframes.

Optionally, the number of the time-domain symbols for transmitting data in the time-domain length is preset; or the number of the time-domain symbols is dynamically determined according to data information such as a size of a data packet which needs to be transmitted.

Optionally, a determining mode of a time-domain region of the time-domain symbols in the subframe is:

determining a time-domain starting position of the time-domain symbols according to position information designated by sent signaling;

or a time-domain starting position of the time-domain symbols being the same as a time-domain starting position of a downlink control channel related to data, or determining a time-domain starting position of the time-domain symbols according to a time-domain starting position of a control channel related to data.

Optionally, a relationship between the data channel and the corresponding control channel is that:

time-domain symbols of the data channels and time-domain symbols of the corresponding control channel have a same time-domain starting position and time-domain ending position; or a time-domain starting position of time-domain symbols of the data channel is next to a time-domain ending position of time-domain symbols of the corresponding control channel of the data channel, and at this moment, the data channel and the corresponding control channel of the data channel have same frequency-domain positions, or the two have different or partially same frequency-domain positions; or time-domain symbols of the data channel and time-domain symbols of the corresponding control channel of the data channel have a same time-domain starting position and a time-domain length of the data channel is greater than or equal to a time-domain length of the control channel, and the time-domain length of the data channel may be preset, or indicated by signaling from the sending node or determined according to the time-domain length of the control channel, or there is a preset mapping relationship between the time-domain length of the data channel and the time-domain length of the control channel; or time-domain positions of time-domain symbols of the data channel are determined according to signaling born by the control channel corresponding to the data channel, and a time-domain starting position of time-domain symbols of the data channel is earlier or later than or the same as a time-domain starting position of time-domain symbols of the control channel; or a time-domain starting position of time-domain symbols of the data channel is set according to the time-domain length of the data channel, and a time-domain symbol region of the control channel is located at a preset position in a time-domain length region of the data channel; or a time-domain length region position of the data channel and a time-domain length region position of the control channel have a preset interval t.

Optionally, frequency-domain positions of the data channel and the corresponding control channel are discontinuous.

The embodiment of the present document further provides a receiving node, configured to acquire information about a data transmission mode; and transmit data according to the acquired data transmission mode, and the information about the data transmission mode includes a rapid data transmission mode, the rapid data transmission mode includes: configuring a time-domain length of data transmission based on a time-domain symbol.

Optionally, the receiving node is further configured to transmit data by using the rapid data transmission mode and/or a conventional data transmission mode according to an indication of a sending node.

Optionally, the receiving node includes user equipment, a micro base station or a home base station.

Optionally, the time-domain symbol at least includes: an Orthogonal Frequency Division Multiplexing (OFDM) symbol, or a Single Carrier Frequency Division Multiple Access (SC-FDMA) symbol, or a non-orthogonal symbol.

Optionally, the time-domain length includes h time-domain symbols, and h is a preset numerical value, or a number of time-domain symbols contained in a time slot, or a number of time-domain symbols contained in a subframe, or a number of all or partial time-domain symbols contained in a plurality of subframes.

Optionally, the number of the time-domain symbols for transmitting data in the time-domain length is preset; or the number of the time-domain symbols is dynamically determined according to data information such as a size of a data packet which needs to be transmitted.

Optionally, a determining mode of a time-domain region of the time-domain symbols in the subframe is:

determining a time-domain starting position of the time-domain symbols according to position information designated by sent signaling;

or a time-domain starting position of the time-domain symbols being the same as a time-domain starting position of a downlink control channel related to data, or determining a time-domain starting position of the time-domain symbols according to a time-domain starting position of a control channel related to data.

Optionally, a relationship between the data channel and a corresponding control channel is that:

time-domain symbols of the data channel and time-domain symbols of the corresponding control channel have a same time-domain starting position and time-domain ending position; or a time-domain starting position of time-domain symbols of the data channel is next to time-domain ending position of time-domain symbols of the corresponding control channel of the data channel, and at this moment, the data channel and the corresponding control channel of the data channel have same frequency-domain positions, or the two have different or partially same frequency-domain positions; or time-domain symbols of the data channel and time-domain symbols of the corresponding control channel of the data channel have a same time-domain starting position, and a time-domain length of the data channel is greater than or equal to a time-domain length of the control channel, and the time-domain length of the data channel may be preset, or indicated by signaling or determined according to the time-domain length of the control channel, or there is a preset mapping relationship between the time-domain length of the data channel and the time-domain length of the control channel; or time-domain positions of time-domain symbols of the data channel are determined according to signaling born by the control channel corresponding to the data channel, and a time-domain starting position of time-domain symbols of the data channel is earlier or later than or the same as a time-domain starting position of time-domain symbols of the control channel; or a time-domain starting position of time-domain symbols of the data channel is set according to the time-domain length of the data channel, and a time-domain symbol region of the control channel is located at a preset position in a time-domain length region of the data channel; or a time-domain length region position of the data channel and a time-domain length region position of the control channel have a preset interval t.

Optionally, frequency-domain positions of the data channel and the corresponding control channel are discontinuous.

The embodiment of the present document further provides a computer program, including program instructions, which, when executed by a transmission node, enable the transmission node to execute the above mentioned method.

The embodiment of the present document further provides a carrier carrying the above mentioned computer program.

According to the embodiments of the present document, the sending node and the receiving node acquire the information about the data transmission mode, and information about the data transmission mode includes a rapid data transmission mode of the time-domain length of data transmission configured based on the time-domain symbol; and the sending node and the receiving node transmit data according to the acquired data transmission mode. In the data transmission method provided by the embodiment of the present document, the time-domain length of data transmission is configured based on the time-domain symbol, the setting of the time-domain length of data transmission is flexible, multiple opportunities of data transmission can exist in one subframe, resources used for data transmission can be guaranteed to be found rapidly when there is a data transmission demand, thus rapid data transmission is realized and data transmission delay is reduced.

In addition, in the embodiments of the present document, by configuring the time-domain length of data transmission based on the time-domain symbol, demands of data scheduling for time-domain resources are reduced, more flexible resource application is realized and spectrum efficiency is improved.

BRIEF DESCRIPTION OF THE DRAWINGS

The drawings described here are used for providing further understanding about the present document and constitutes a part of the present application. The schematic embodiments of the present document and the description of the schematic embodiments are used for explaining the present document rather than improperly limiting. Among the drawings.

PREFERRED EMBODIMENTS

The embodiments of the present document will be described below in detail in combination with the drawings. It needs to be stated that the embodiments in the present application and the features in the embodiments can be freely combined under the situation of no conflict.

Figure 3:
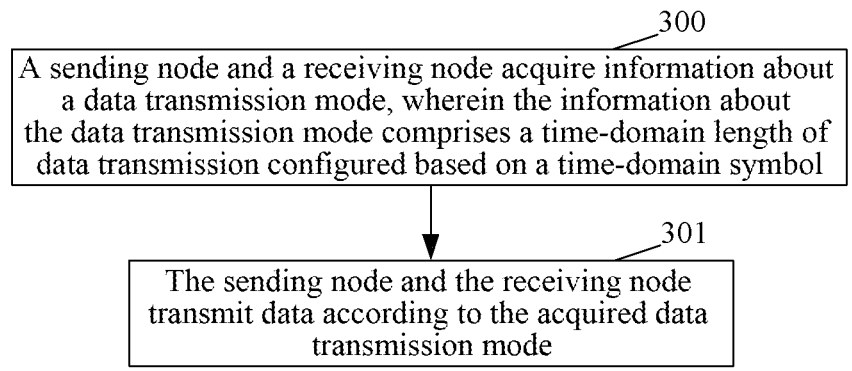
FIG. 3 is a flowchart of a data transmission method according to the embodiment of the present document.

FIG. 3 is a flowchart of a data transmission method according to the embodiment of the present document. As illustrated in FIG. 3, the data transmission method includes the following steps:

In step 300, a transmission node acquires information about a data transmission mode, and the information about the data transmission mode includes a rapid data transmission mode, the rapid data transmission mode includes a time-domain length of data transmission configured based a time-domain symbol.

The transmission node includes a sending node and a receiving node. It needs to be stated that, for transmission networks such as some private networks or dedicated networks in which sending nodes only supporting the rapid data transmission mode are located, all receiving nodes accessing to the transmission networks use the rapid data transmission mode to transmit data.

In this step, acquiring the information about the data transmission mode includes:

mode 1: an upper node in a transmission network sends the information about the data transmission mode to the sending node before the data transmission, and the sending node sends the information about the data transmission mode to the receiving node; or mode 2: the sending node sends the information about the data transmission mode to the receiving node before the sending node sends data when the receiving node needs to perform data transmission; or mode 3: the sending node sends the information about the data transmission mode in control information corresponding to data before the sending node sends the data when the receiving node needs to perform data transmission; or mode 4: the information about the data transmission mode is dynamically determined according to data information which needs to be transmitted such as a size of a data packet, a service type and transmission mode request information when data transmission is performed between the sending node and the receiving node, including: the information about the data transmission mode is determined according to a size of a transmission block, e.g., if the transmission block is less than a preset value X1, a corresponding time-domain configuration information length is a preset value L1, and if the transmission block is greater than the preset value X1 and less than a preset value X2, the corresponding time-domain configuration information length is a preset value L2, or the information about the data transmission mode is determined according to the size of the transmission block and other information including system bandwidth and/or time-domain OFDM symbol length, etc. The above-mentioned modes may be combined, e.g., mode 1 or mode 2 is combined with mode 3, i.e., several time-domain lengths are configured in advance and the time-domain length is dynamically selected from the existing configurations when data are transmitted; or mode 1 or mode 2 is combined with mode 4, i.e., several time-domain lengths are configured in advance and then the time-domain length is selected from the predetermined configurations according to an agreed way; or mode 3 is combined with mode 4, i.e., the current configuration is jointly determined according to configuration information in current scheduling information and an agreed way.

In step 300,
the time-domain symbol at least includes: an Orthogonal Frequency Division Multiplexing (OFDM) symbol, or a Single Carrier Frequency Division Multiple Access (SC-FDMA) symbol, or a non-orthogonal symbol.

The time-domain length includes h time-domain symbols. Optionally, h includes one of the following: a preset numerical value such as 1, 2, 3, 4, 8 and 10, or the number of time-domain symbols contained in a time slot, or the number of time-domain symbols contained in a subframe, or the number of all or partial time-domain symbols contained in a plurality of subframes, and the number of time-domain symbols contained in one or more subframes mainly involves in an application scenario that the time-domain length of one or more subframes is less than 1 ms; or the situation of dividing into a plurality of small data packets needs to be avoided so as to realize transmission of larger data packets.

It needs to be stated that, the subframe with a length less than 1 ms is a subframe in a frame structure newly defined in the embodiment of the present document and is different from the defined subframe in the frame structure of the existing LTE system; and the time-domain length may be a fixed length, may also be one of a plurality of preset lengths and is semi-statically or dynamically selected through signaling or other implicit ways (e.g., related control channel information, data packet repeat information, etc.).

Through the time-domain length of data transmission in the embodiment of the present document, multiple opportunities of data transmission can exist within 1 ms, resources used for data transmission can be guaranteed to be found rapidly when there is a data transmission demand, and thus rapid data transmission is realized.

Optionally, the number of the time-domain symbols for transmitting data in the time-domain length is preset; or in order to realize more rapid data transmission, the number of the time-domain symbols may be dynamically determined according to information of data which needs to be transmitted such as a size of a data packet, such that the data can be guaranteed to be completely transmitted within a time as short as possible, and the problem of time delay caused by dividing one data packet into a plurality of small data packets for transmission since the time-domain length of data transmission is limited is avoided.

Optionally, a determining mode of a time-domain region of the time-domain symbols in the subframe is:

determining a time-domain starting position of the time-domain symbols according to position information designated by sent signaling, herein the signaling is transmitted through a physical layer control channel, or is RRC signaling, or MME configuration signaling; or a time-domain starting position of the time-domain symbols being the same as a time-domain starting position of a downlink control channel related to data, or determining a time-domain starting position of the time-domain symbols according to a time-domain starting position of a control channel related to data, e.g., an interval between the time-domain starting position of the data channel and the last time-domain position of the corresponding control channel being a predefined value, such as 0, 1, 2, 3, 6, 7, 9 and 10.

Figure 4A:
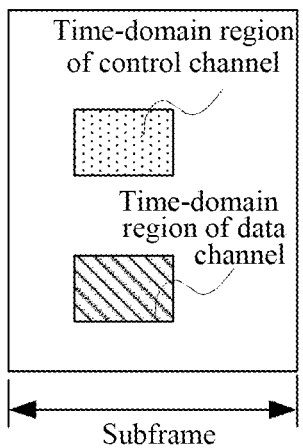
FIG. 4(a) is a schematic diagram of a first mode for time-domain positions of a data channel and its corresponding control channel according to the embodiment of the present document.
Figure 4B:
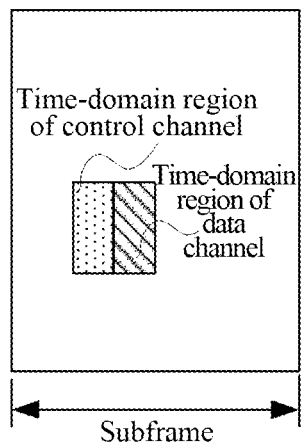
FIG. 4(b) is a schematic diagram of a second mode for time-domain positions of a data channel and its corresponding control channel according to the embodiment of the present document.
Figure 4C:
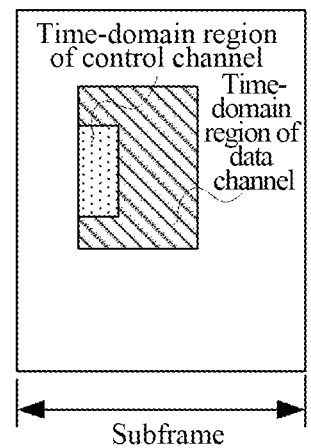
FIG. 4(c) is a schematic diagram of a third mode for time-domain positions of a data channel and its corresponding control channel according to the embodiment of the present document.

Optionally, a relationship between the data channel and a corresponding control channel is that:

in a first relationship, time-domain symbols of the data channel and time-domain symbols of the corresponding control channel have the same time-domain starting position and time-domain ending position, as illustrated in FIG. 4(a); or in a second relationship, a time-domain starting position of time-domain symbols of the data channel is next to a time-domain ending position of time-domain symbols of its corresponding control channel as illustrated in FIG. 4(b), and at this moment, the data channel and its corresponding control channel have the same frequency-domain positions, or have different or partially same frequency-domain positions; optionally, if the data channel and its corresponding control channel agree to have the same frequency-domain positions, the frequency-domain positions of the data channel do not need to be indicated by signaling and the frequency-domain positions of the data channel may be determined according to the detected control channel; or the frequency-domain positions of the data channel and its corresponding control channel are respectively determined, and the frequency-domain positions of the data channel may be determined through resource indication signaling born by the control channel; or in a third relationship, time-domain symbols of the data channel and time-domain symbols of its corresponding control channel have the same time-domain starting position and a time-domain length of the data channel is greater than or equal to a time-domain length of the control channels, as illustrated in FIG. 4(c), and the time-domain length of the data channel may be preset, or indicated by signaling from the sending node (i.e., the sending node transmits a data channel time-domain length signaling indication to the receiving node, and after the receiving node receives the signaling indication, the receiving node determines the time-domain length of the data channel according to the signaling indication) or determined according to the time-domain length of the control channel, e.g., the time-domain length of the data channel is k times of the time-domain length of the control channel, and k is 1, 2, 3, 4, etc., or the time-domain length of the data channel and the time-domain length of the control channel have a preset mapping relationship, as shown in Table 1 and Table 2; at this moment, the frequency-domain positions of the data channel and its corresponding control channel are not strictly limited, i.e., may be the same and may also be different;

TABLE 1

| Time-domain length of contorl channel | 1 | 2 | 3 | 4 |
|---|---|---|---|---|
| Time-domain length of data channel | 2 | 3 | 5 | 6 | or as shown in Table 2,

TABLE 2

| Time-domain length of contorl channel | 1 | 2 | 3 |
|---|---|---|---|
| Time-domain length of data channel | 2 | 4 | 4 |

Figure 4D:
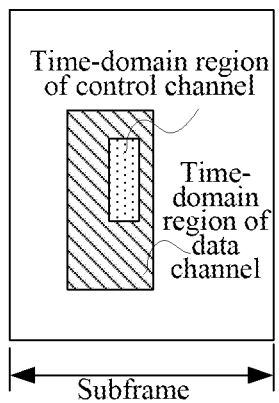
FIG. 4(d) is a schematic diagram of a fourth mode for time-domain positions of a data channel and its corresponding control channel according to the embodiment of the present document.
Figure 4E:
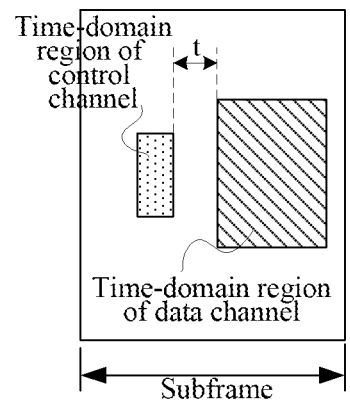
FIG. 4(e) is a schematic diagram of a fifth mode for time-domain positions of a data channel and its corresponding control channel according to the embodiment of the present document.

Indicating the time-domain length of the data channel through the signaling includes: the sending node transmitting data channel time-domain length indication signaling to the receiving node, and after the receiving node receives the signaling, determining the time-domain length of the data channel according to the signaling, herein the signaling may represent a length value, and several values may also be preset and the value is dynamically selected according to the signaling; or in a fourth relationship, time-domain positions of time-domain symbols of the data channel are determined according to signaling born by the control channel corresponding to the data channel, and a time-domain starting position of time-domain symbols of the data channel may be earlier than a time-domain starting position of time-domain symbols of the control channel, as illustrated in FIG. 4(d), may also be the same as a time-domain starting position of time-domain symbols of the control channel, as illustrated in FIG. 4(c), and may also be later than a time-domain starting position of time-domain symbols of the control channel, as illustrated in FIG. 4(b) or 4(e); or a time-domain starting position of time-domain symbols of the data channel is set according to the time-domain length of the time-domain symbols, and time-domain symbol region of the control channel is located at preset positions in the time-domain length region of the data channel, e.g., the time-domain length of each data channel is 3 OFDM symbols, the time-domain symbol region of the corresponding control channel is located on a second OFDM symbol of the time-domain length region of the data channel, or the time-domain length of each data channel is 5 OFDM symbols, the time-domain symbol region of the corresponding control channel is located on a second OFDM symbol and a third OFDM symbol of the time-domain length region of the data channel, etc.; or in a fifth relationship, time-domain length region positions of the data channels and time-domain length region positions of the control channels have a fixed interval t, as illustrated in FIG. 4(e), and at this moment, according to the mode of configuring the time-domain length of data transmission based on the time-domain symbol in the embodiment of the present document, in one subframe, one or more time-domain regions for transmitting the data channel may exist, the number of the time-domain regions depends on the time-domain length of the data channel, and how to determine can be easily realized by one skilled in the art according to the method provided by the embodiment of the resent document and thus is not repetitively described here.

Frequency-domain positions of the data channel and its corresponding control channel may be discontinuous and may also be continuous, and specific implementation thereof does not limit the protection range of the present document.

The data channel and its corresponding control channel include: a downlink data channel and its corresponding downlink control channel, and/or a uplink data channel and its corresponding uplink control channel, and, the uplink control channel is used for bearing uplink control information, such as Hybrid Automatic Repeat reQuest Acknowledgment (HARQ-ACK), and Channel State Information (CSI); and the time-domain length of the uplink control channel is also allocated based on the time-domain symbols.

Optionally, if the uplink data channel uses autonomous scheduling, the uplink control channel may be used for indicating related transmission information of the corresponding data channel, e.g., a size of a transmission block, a new data packet/old data packet, version information, related reference signal information, etc., and autonomous scheduling refers to pre-allocating partial sources, e.g., PUSCH resources or resources for transmitting data with a new time-frequency unit as a unit. Under this situation, when the receiving node has a data transmission demand, the receiving node directly transmits data on the predefined resources and does not need to send a scheduling request to the sending node to wait for the scheduling by the sending node, such that the delay caused by waiting for scheduling is decreased, the data transmission delay is shortened and thus the data transmission speed is improved.

Therein, the resources of the control channel are mapped by using a preset mode, e.g., locating on preset time-domain resources, data transmission is performed according to the preset size of the transmission block, and a fixed modulating and coding mode is used, including: a frequency domain is continuously or discretely mapped by taking a resource block as a unit or is continuously or discretely mapped by taking a specific control channel unit; the control channel and the data channel may be multiplexed on a same resource block of a same time-domain symbol, or multiplexed on different time-domain symbols of a same resource block, or multiplexed on different resource blocks of a same time-domain symbol.

In step 301, the sending node and the receiving node transmit data according to the acquired data transmission mode.

In this step, transmitting the data according to the data transmission mode includes: transmitting uplink data and its corresponding control channel according to the data transmission mode, and/or transmitting downlink data and its corresponding control channel according to the data transmission mode, i.e., data transmission is performed according to time-frequency resources designated in the data transmission mode. Transmission includes sending and/or receiving. Therein, the uplink data are born through the uplink data channel, uplink control information is born through the uplink control channel; and the uplink control information includes feedback information of downlink data, and/or channel state information, and/or transmission information related to uplink data, etc. The transmitted data include a size of a transmission block, and/or a new data packet/old data packet, and/or version information, and/or a modulating mode, and/or related reference signal information.

The sending node receives uplink data and its corresponding control channel and/or sending downlink data and its corresponding control channel according to the configuration of the data channel and the control channel in the embodiment of the present document, and the sending node includes but not limited to a base station, a relay transmission node, a wireless gateway or a router; and the receiving node receives downlink data and/or sends uplink data according to the configuration of the data channel and the control channel in the present document, and the receiving node includes but not limited to User Equipment (UE), a micro base station or a home base station.

Figure 5:
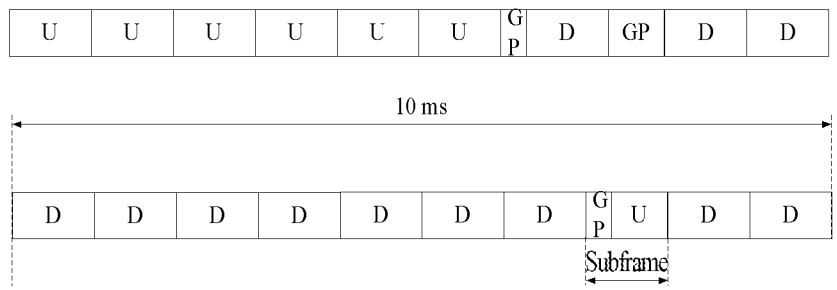
FIG. 5 is a schematic diagram of data sending in a rapid data transmission mode under a spectrum share scenario according to the embodiment of the present document.

Through the data transmission in the embodiment of the present document, when sharing different system resources, high-efficiency use of resources are guaranteed, and the problem of limited share resource use efficiency caused by different frame structures of all systems during spectrum sharing between different systems such as LTE, WIFI, High Speed Downlink Packet Access (HSDPA), 3G systems and 2G systems is solved; and meanwhile, switching of uplink and downlink resources within a shorter time is realized, e.g., downlink data transmission is performed on partial time-domain symbols of an uplink subframe, uplink data transmission is performed on partial time-domain symbols of a downlink subframe, etc. FIG. 5 is a schematic diagram of data transmission in a rapid data transmission mode under a spectrum share scenario according to the embodiment of the present document. In FIG. 5, U expresses resources for transmitting uplink data, D expresses resources for transmitting downlink data, and GP expresses a guard interval. As illustrated in FIG. 5, this scenario mainly utilizes flexible change of data transmission time-domain length to realize rapid scheduling of idle resources, such that the idle resources are decreased and the resource use efficiency is improved. Therein, idle resources may be partial uplink resources which are caused to be idle due to uplink and downlink service asymmetry such that the idle uplink resources are used for transmitting downlink data, or partial downlink resources are idle such that the idle downlink resources are used for transmitting uplink data, or when the LTE system and other systems share spectrum resources and the other systems do not use the resources, the LTE system may use the idle resources to transmit uplink data or downlink data. Optionally, if the information about the data transmission mode further includes: there are two or more time-domain regions for transmitting the data channel in a subframe, i.e., a plurality of data transmission opportunities exist in 1 ms, before transmitting the data according to the acquired data transmission mode in this step, the method further includes dividing data transmission opportunities, including: continuously dividing data transmission opportunities or dividing data transmission opportunities according to a preset interval, and, continuous dividing data transmission opportunities includes:

numbering all time-domain symbols available for data transmission in a preset specific time window, and sequentially setting apart every h time-time symbols into a time-domain unit, herein the time-domain unit is used for data transmission. For example, supposing that the number of time-domain symbols available for data transmission within 1 ms is 11, if h is 2, 6 time-domain units can be set and the last time-domain unit includes one time-domain symbol; or 5 time-domain units are set apart and the last time-domain unit includes 3 time-domain symbols. For another example, supposing that the number of time-domain symbols available for data transmission within 3 ms is 33, if h is 3, 11 time-domain units can be set apart. For another example, supposing that the number of time-domain symbols available for data transmission in 2 ms is 20, if h is 4, 5 time-domain units can be set apart, etc.

Dividing data transmission opportunities according to the preset interval includes:

supposing that k data transmission opportunities exist in a specific time window, herein k is a preset value, and using remaining other time-domain symbols for other purposes, e.g., control channel transmission, reference signal transmission, synchronizing channel or broadcast channel or multicast channel transmission, etc., herein reference signals may be used for measurement and may also be used for demodulation. For example, supposing that the specific time window is 1 ms and k is 2, i.e., two data transmission opportunities exist within 1 ms, and supposing that the number of available time-domain symbols in 1 ms is 11 and h is 4, middle available time-domain symbols are selected for data transmission, e.g., the second to fifth available time-domain symbols and the seventh to tenth available time-domain symbols are respectively used for data transmission, and the first, sixth and eleventh time-domain symbols are used for other purposes.

The specific time window mainly limits the time-domain region used for transmitting the data channel.

In the data transmission method provided by the embodiment of the present document, the time-domain length of data transmission is configured based on the time-domain symbol, the setting of the time-domain length of data transmission is flexible, multiple opportunities of data transmission can exist in one subframe, resources used for data transmission can be guaranteed to be found rapidly when there is a data transmission demand, thus rapid data transmission is realized and data transmission delay is reduced. Further, by configuring the time-domain length of data transmission based on the time-domain symbol, the demands of data scheduling for time-domain resources are reduced, more flexible resource application is realized and spectrum efficiency is improved.

When the sending node not only supports the rapid data transmission mode, but also supports a conventional data transmission mode, the method further includes: the sending node determining whether the receiving node uses the rapid data transmission mode, including:

the sending node determining whether the receiving node uses the rapid data transmission mode according to preset transmission information of the receiving node, and when determining that the receiving node uses the rapid data transmission mode, sending the information about the data transmission information to the receiving node to indicate that the data transmission mode of the receiving node is the rapid data transmission mode.

Therein, the preset transmission information of the receiving node at least includes at least one of the following: transmission mode request information, device type information and service type information.

Determining whether the receiving node uses the rapid data transmission mode includes:

if the sending node receives transmission mode request information from the receiving node, the sending node determining that the receiving node uses the rapid data transmission mode; or if the sending node determines that a type of the receiving node is a device supporting rapid data transmission according to device type information of the receiving node, the sending node determining that the receiving node uses the rapid data transmission mode; or if the sending node determines that a service type of the receiving node includes an ultralow delay service and/or data demanded by a small resource block, e.g., an ultralow delay demand service of 1 ms, 20 ms, etc. according to service type information of the receiving node, the sending node determining that the receiving node uses the rapid data transmission mode; or the sending node determining whether the receiving node uses the rapid data transmission mode according to device type information and service type information of the receiving node, and when a device type of the receiving node is a device supporting the rapid data transmission mode and a service type of the receiving node is a service type using the rapid data transmission mode, the sending node determining that the receiving node uses the rapid data transmission mode.

When the device type of the receiving node is not a device supporting the rapid data transmission mode or the service type of the receiving node is not a service type using the rapid data transmission mode, the sending node determines that the receiving node transmits data according to the conventional data transmission mode.

Therein, for the receiving with an ultralow delay data transmission demand, the sending node further judges the current service demand, such as Quality of service (Qos) and service type, and determines whether the receiving node uses the rapid data transmission mode; or the sending node determines whether the receiving node uses the rapid data transmission mode according to the transmission mode request information received from the receiving node having the ultralow delay data transmission demand, and if the transmission mode request information is not received from the receiving node, the receiving node uses the conventional data transmission mode to transmit data.

Figure 1:
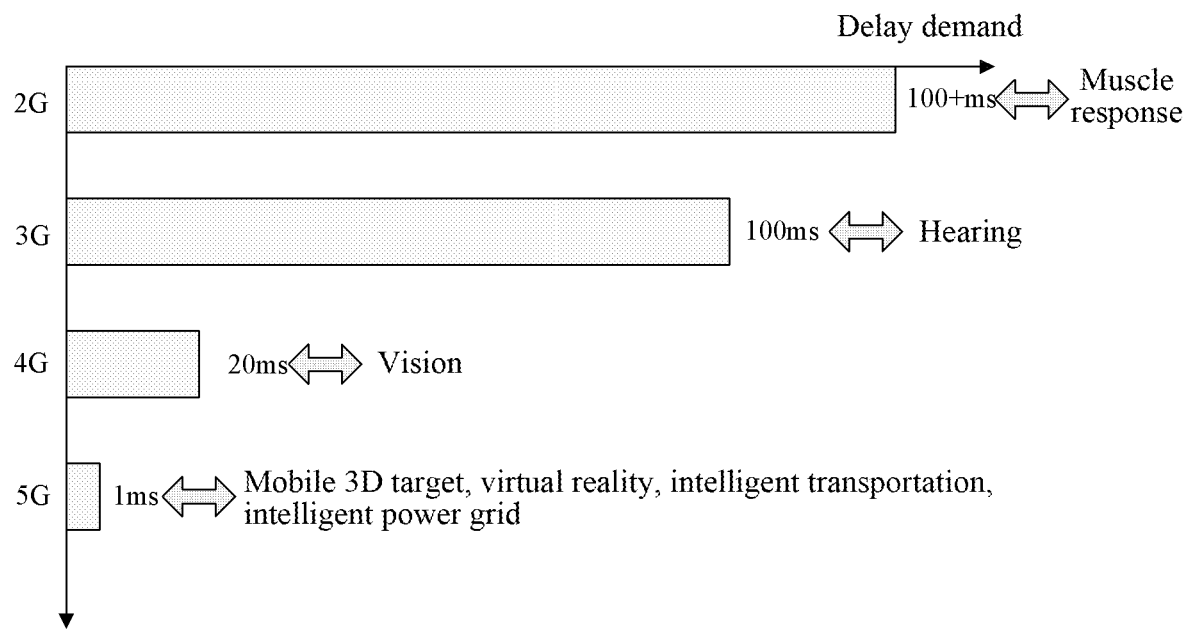
FIG. 1 is a schematic diagram of delay transmission features in different generation mobile communication technologies.
Figure 2:
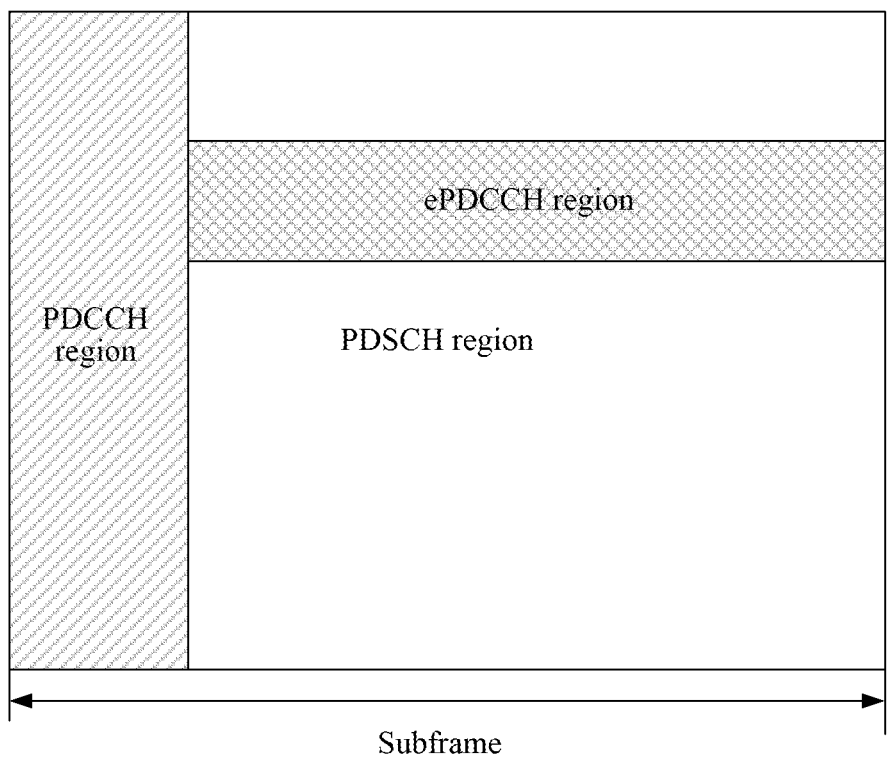
FIG. 2 is a schematic diagram of a physical downlink control channel and a physical downlink share channel in an LTE system.

Optionally, if the sending node determines that the receiving node simultaneously supports the rapid data transmission mode and the conventional data transmission mode, and the conventional data transmission mode refers to the transmission mode supported by the existing LTE standards (R8 to R12) and the corresponding data channel and control channel transmission modes, as illustrated in FIG. 2, at this moment, the method provided by the embodiment of the present document further includes:

the sending node setting the receiving node to simultaneously use the rapid data transmission mode and the conventional data transmission mode, herein the rapid data transmission mode and the conventional data transmission mode of the receiving node are located in different serving cells (the serving cells may also be viewed as component carriers), or are located on different subframes of a same serving cell, or are located on different time-domain symbols of a same subframe of a same serving cell.

Figure 6A:
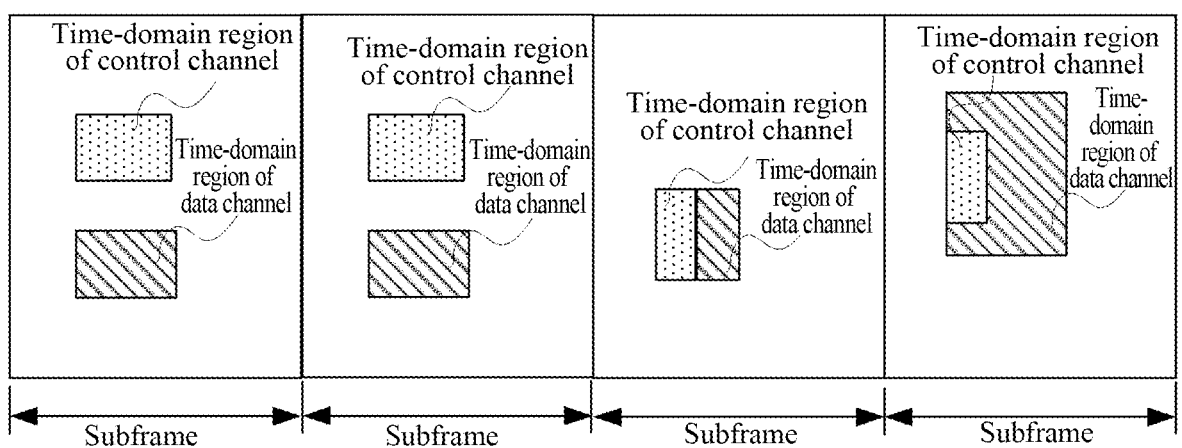
FIG. 6(a) is a schematic diagram of a rapid data transmission mode used by a dedicated serving cell in a multiplexing mode of the rapid data transmission mode and a conventional data transmission mode according to the embodiment of the present document.
Figure 6B:
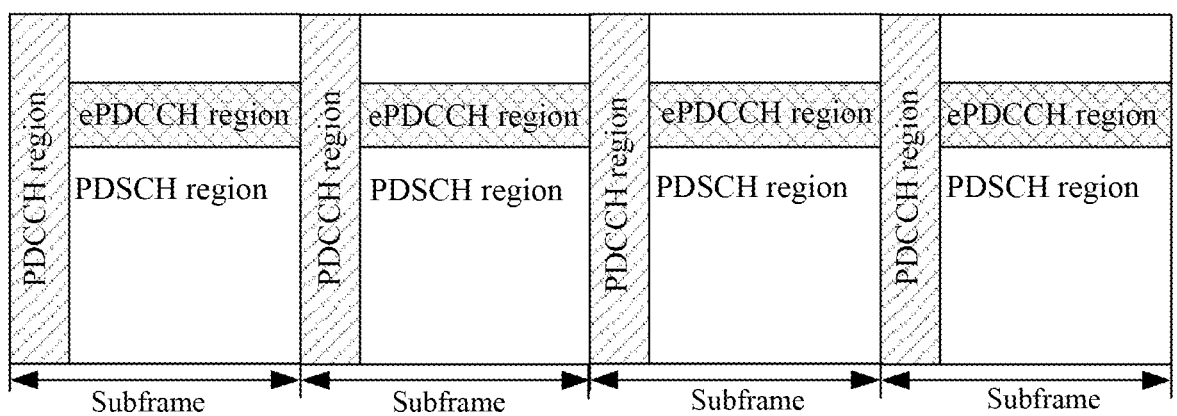
FIG. 6(b) is a schematic diagram of a conventional data transmission mode used by a primary serving cell in a multiplexing mode of a rapid data transmission mode and the conventional data transmission mode according to the embodiment of the present document.
Figure 7:
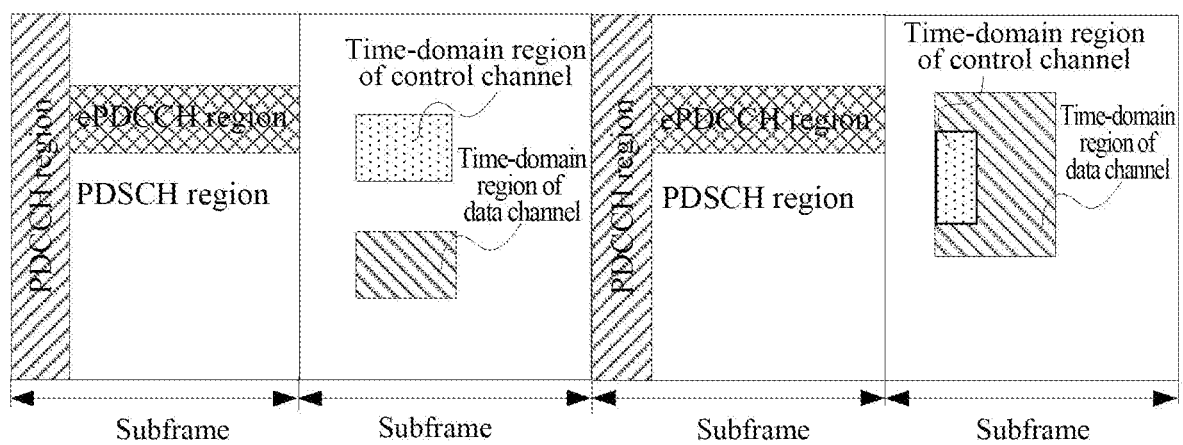
FIG. 7 is a schematic diagram of different transmission modes used by different subframe sets of a same serving cell in a multiplexing mode of a rapid data transmission mode and a conventional data transmission mode according to the embodiment of the present document.
Figure 8:
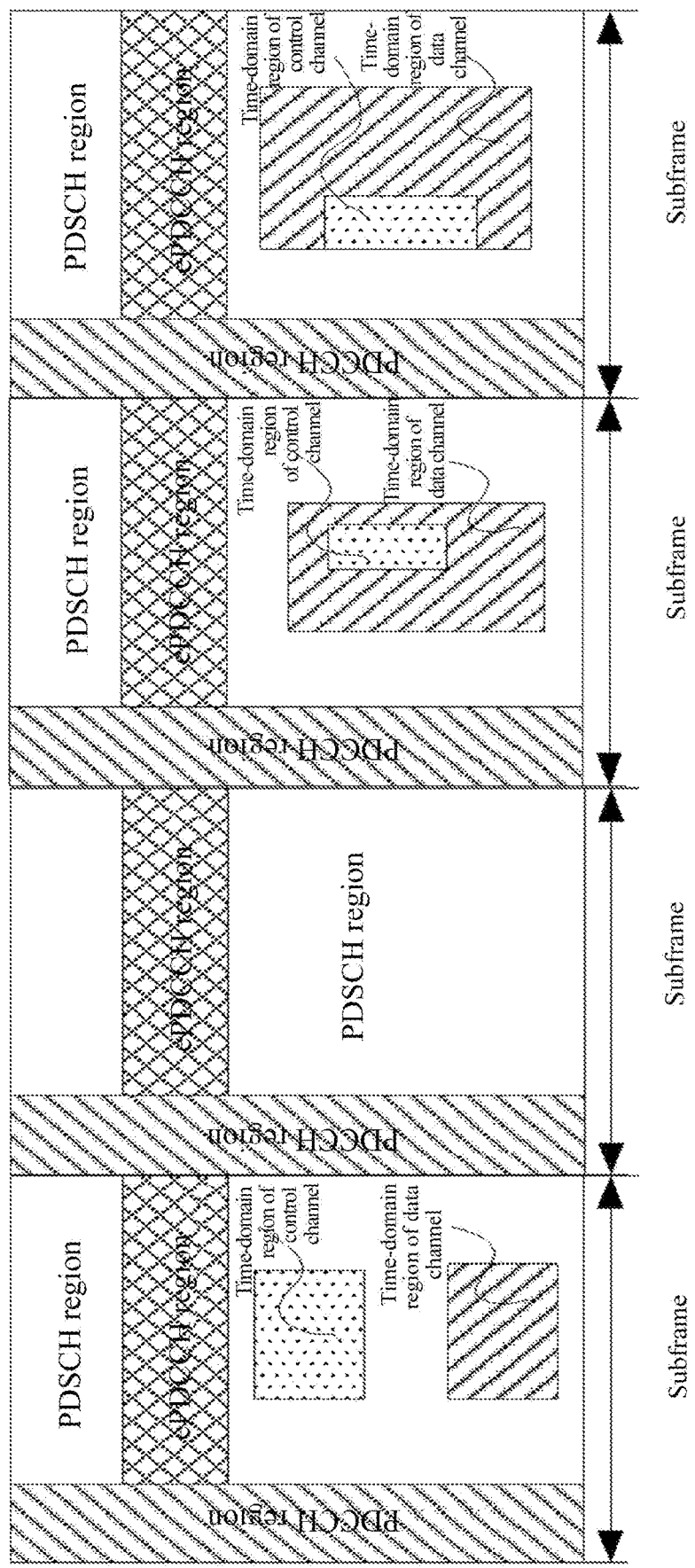
FIG. 8 is a schematic diagram of different transmission modes used by different time-domain symbols of a same subframe of a same serving cell in a multiplexing mode of a rapid data transmission mode and a conventional data transmission mode according to the embodiment of the present document.

Optionally, a primary serving cell uses the conventional data transmission mode, and a secondary serving cell uses the rapid data transmission mode; and/or the primary serving cell uses the conventional data transmission mode and a dedicated serving cell uses the rapid data transmission mode, and the dedicated serving cell is a serving cell specially used for the rapid data transmission mode or a serving cell specially used for multi-system spectrum share (such as LTE and TD-SCDMA, LTE and WCDMA, LTE and CDMA, etc.), as illustrated in FIG. 6(a) which is a schematic diagram of a rapid data transmission mode used by a dedicated serving cell in embodiment 1 of a multiplexing mode of the rapid data transmission mode and a conventional data transmission mode according to the present document, and FIG. 6(b) which is a schematic diagram of a conventional data transmission mode used by a primary serving cell in embodiment 1 of a multiplexing mode of a rapid data transmission mode and the conventional data transmission mode according to the present document; and/or different subframe sets of a same serving cell use different transmission modes, e.g., supposing that subframe 0, subframe 1, subframe 4, subframe 5, subframe 6 and subframe 9 form a subframe set 1, and subframe 2, subframe 3, subframe 7 and subframe 8 form a subframe set 2, the subframe set 1 corresponds to the conventional data transmission mode, and the subframe set 2 corresponds to the rapid data transmission mode, as illustrated in FIG. 7; and/or different time-domain symbols of a same subframe of a same serving cell use different transmission modes, e.g., the first two OFDM symbols of the subframe perform data transmission according to the conventional transmission mode, and remaining OFDM symbols perform data transmission according to the rapid transmission mode, and the receiving node performs data detection on the first n OFDM symbols of the subframe, e.g., detection of a Physical Control Format Indication Channel (PCFICH) and a PDCCH, a Physical Hybrid Automatic Repeat Indication Channel (PHICH), determines the value of n according to the PCFICH, and performs data transmission detection according to the rapid data transmission mode on the remaining OFDM symbols, as illustrated in FIG. 8.

It needs to be stated that the configuration mode of the data transmission mode of the embodiment of the present document may use a combination of a plurality of modes, e.g., a combination of a subframe configuration mode and a configuration mode based on a serving cell, or a combination of a configuration mode of different time-domain symbols in a subframe and a configuration mode based on a serving cell, or a combination of a subframe configuration mode, a configuration mode based on a serving cell, and a configuration mode of different time-domain symbols in a subframe, etc., which is not limited here.

One or more relationships may exist between the control channel and the data channel, e.g., different resources select different modes, or different service types select different modes, or different terminals select different modes, or different transmission nodes select different modes, or different configurations are performed aiming at a plurality of different resource selections, service types, terminals and transmission nodes, etc.

Embodiment 1

It is supposed that a sending node is a relay transmission node and a receiving node is user equipment. After the relay transmission node in this embodiment determines that the user equipment supports a rapid data transmission mode, data are transmitted between the relay transmission node and the user equipment according to the rapid data transmission mode, and the rapid data transmission mode includes: a time-domain length of data transmission is configured based on a time-domain symbol.

It needs to be stated that, if the relay transmission node is a transmission node which only supports the rapid data transmission mode, all user equipment accessing to the relay transmission node use the rapid data transmission mode to transmit data; and at this moment, a mode configuration does not need to be sent to the user equipment and the user equipment accessing to the relay transmission node can recognize that the rapid data transmission mode needs to be used to perform data transmission.

However, if the relay transmission node not only supports the rapid data transmission mode, but also supports a conventional data transmission mode, the relay transmission node needs to determine whether the accessing user equipment supports the rapid data transmission mode according to predefined transmission information of the user equipment, and the predefined transmission information at least includes at least one of the following: transmission mode request information, user equipment type and service information, and the transmission mode request information is sent by the user equipment; the user equipment type includes user equipment having an ultralow delay data transmission demand; and the service type includes an ultralow delay service, data demanded by a small resource block, etc., e.g., ultrasonic delay demand services of 1 ms, 20 ms, etc. With respect to the user equipment having an ultralow delay data transmission demand, the relay transmission node further judges the current service demand, such as Quality of service (Qos) and service type, and determines whether the user equipment uses the rapid data transmission mode; or the relay transmission node determines whether the user equipment uses the rapid data transmission mode according to the transmission mode request information received from the user equipment having the ultralow delay data transmission demand, and if the transmission mode request information is not received from the user equipment, the user equipment uses the conventional data transmission mode to transmit data; and thereafter, the relay transmission node sends transmission mode configuration information to the user equipment to indicate that the transmission mode of the user equipment is the rapid data transmission mode.

Therein, the time-domain symbol includes at least one of the following: an Orthogonal Frequency Division Multiplexing (OFDM) symbol, a Single Carrier Frequency Division Multiple Access (SC-FDMA) symbol, and a non-orthogonal symbol; and the time-domain length includes h time-domain symbols, and optionally, h includes at least one of the following: 1, 2, 3, 4, 8, 10, the number of time-domain symbols contained in a time slot, the number of time-domain symbols contained in a subframe, and the number of time-domain symbols contained in a plurality of subframes.

The time-domain length of the data channel may be dynamically changed and may also be fixed.

Therein, a relationship between the data channel and a corresponding control channel includes at least one of the following:

relationship 1: time-domain symbols of the data channel and time-domain symbols of the corresponding control channel have the same time-domain starting position and time-domain ending position, e.g., the time-domain length of the data channel and the time-length of its corresponding control channel are 1 OFDM symbol, or 2 OFDM symbols, or 3 OFDM symbols, etc.;

relationship 2: a time-domain starting position of time-domain symbols of the data channel is next to a time-domain ending position of time-domain symbols of the corresponding control channel, e.g., the time-domain length of the data channel is 1, 2, or 3 OFDM symbols, and the time-domain length of the corresponding control channel is 1 OFDM symbol, etc.;

relationship 3: time-domain symbols of the data channel and time-domain symbols of the corresponding control channel have the same time-domain starting position, and a time-domain length of the data channel is greater than or equal to a time-domain length of the control channel, e.g., the time-domain length of the data channel is 2, 3 or 4 OFDM symbols, and the time-domain length of its corresponding control channel is 1 OFDM symbol; or the time-domain length of the data channel is 3, 4 or 5OFDM symbols, and the time-domain length of the corresponding control channel is 2OFDM symbols, etc.;

relationship 4: time-domain positions of time-domain symbols of the data channel are determined according to signaling born by the corresponding control channel, e.g., signaling born by the corresponding control channel indicates an interval between the time-domain starting position of the data channel and the time-domain starting position of the control channel, and an interval between the time-domain ending position of the data channel and the time-domain ending position of the control channel; or signaling born by the corresponding control channel indicates the time-domain starting position of the data channel and the time-domain length of the data channel; or signaling born by the corresponding control channel indicates an interval between the time-domain starting position of the data channel and the time-domain starting position of the control channel, and the time-domain length of the data channel; or signaling born by the corresponding control channel indicates an interval between the time-domain starting position of the data channel and the time-domain ending position of the control channel, and the time-domain length of the data channel is a fixed value; or signaling born by the corresponding control channel indicates an interval between the time-domain starting position of the data channel and the time-domain ending position of the control channel, and the time-domain length of the data channel, etc.; and relationship 5: a time-domain position of the data channel and a time-domain position of the control channel have a fixed interval, e.g., a fixed interval of 1, 3, 5, 8 or 10 OFDM symbols, etc.

The frequency-domain position of the data channel is indicated by information born by the corresponding control channel; or the frequency-domain position is determined according to the frequency-domain position of the corresponding control channel, e.g., they are the same frequency-domain positions or have a specific mapping relationship, e.g., the control channel is located on frequency-domain position X, the data channel is located on frequency-domain position 2*X or (X+1), etc.; or the position of the data channel is preconfigured by a base station, etc.

In embodiment 1, transmitting the data according to the rapid data transmission mode includes: the relay transmission node receiving uplink data and its corresponding control channel according to the rapid data transmission mode, and/or sending downlink data and its corresponding control channel according to the rapid data transmission mode; and the user equipment receiving downlink data and/or sending uplink data according to the configurations of the data channel and the control channel.

The relay transmission node receives the uplink data and the corresponding uplink control information sent by the user equipment, and the uplink data are born through the uplink data channel, and the uplink control information is born through the uplink control channel; and the uplink control information includes at least one of the following: feedback information of downlink data, downlink channel state information and transmission information related to the uplink data.

The transmission information transmitted through the rapid data transmission mode includes at least one of the following: a size of a transmission block, a new data packet/old data packet, version information, a modulating mode and related reference signal information; the base station firstly decodes the control channel to acquire the transmission information, and then decodes the data channel according to the transmission information.

In addition, when the data channel is an uplink data channel, the data channel may not have a corresponding control channel, and data transmission is performed in a predefined format according to resources pre-allocated by the base station and the service demand of the user equipment, e.g., code modulation and sending are performed according to the transmission block with the predetermined size, and whether data repeat is performed is determined according to feedback information for the base station sending data to the user equipment.

Particularly, if the relay transmission node configures that the user equipment simultaneously supports the rapid data transmission mode and the conventional data transmission mode, the rapid data transmission mode and the conventional data transmission mode of the receiving node are located on different component carriers (serving cells), or are located on different subframes of a same component carrier (serving cell) or different time-domain symbols of a same subframe.

Optionally, a primary serving cell uses the conventional data transmission mode, and a secondary serving cell uses the rapid data transmission mode; or the primary serving cell uses the conventional data transmission mode and a dedicated serving cell uses the rapid data transmission mode, and the dedicated serving cell is a serving cell specially used for the rapid data transmission mode or a serving cell specially used for multi-system spectrum share (such as LTE and TD-SCDMA, LTE and WCDMA, LTE and CDMA, etc.), as illustrated, FIG. 6(a) is a schematic diagram of a rapid data transmission mode used by a dedicated serving cell in embodiment 1 of a multiplexing mode of the rapid data transmission mode and a conventional data transmission mode according to the present document, and FIG. 6(b) is a schematic diagram of a conventional data transmission mode used by a primary serving cell in embodiment 1 of a multiplexing mode of a rapid data transmission mode and the conventional data transmission mode according to the present document; or different subframe sets of a same serving cell use different transmission modes, e.g., supposing that subframe 0, subframe 1, subframe 4, subframe 5, subframe 6 and subframe 9 form a subframe set 1, and subframe 2, subframe 3, subframe 7 and subframe 8 form a subframe set 2, the subframe set 1 corresponds to the conventional data transmission mode, and the subframe set 2 corresponds to the rapid data transmission mode, as illustrated in FIG. 7; or different time-domain symbols of a same subframe of a same serving cell use different transmission modes, e.g., the first two OFDM symbols of the subframe perform data transmission according to the conventional transmission mode, and remaining OFDM symbols perform data transmission according to the rapid transmission mode, and the receiving node performs data detection on the first n OFDM symbols of the subframe, e.g., detection of a Physical Control Format Indication Channel (PCFICH) and a PDCCH, a Physical Hybrid Automatic Repeat Indication Channel (PHICH), determines the value of n according to the PCFICH, and performs data transmission detection according to the rapid data transmission mode on the remaining OFDM symbols, as illustrated in FIG. 8.

Embodiment 2

User equipment determines whether to transmit data according to a rapid data transmission mode according to predefined transmission information, and the rapid data transmission mode includes: a time-domain length of data transmission is configured based on a time-domain symbol.

Therein, the predefined transmission information at least includes at least one of the following: configuration information, access system (transmission node) type and service information; the access system type includes the system supporting the rapid data transmission mode; the configuration information is configuration information sent by the transmission node; and the service type includes an ultralow delay service and data demanded by a small resource block, e.g., an ultralow delay demand service of 1 ms, 20 ms, etc.

Therein, the user equipment may determine whether to transmit data according to the rapid data transmission mode as follows:

the user equipment firstly determines whether the current system supports the rapid data transmission mode according to the access system type, and if the current system supports the rapid data transmission mode, when the user equipment has a demand of service type data transmission, the user equipment performs data transmission in resources pre-allocated by the relay transmission node or performs data transmission at resource positions indicated by downlink control information; or the user equipment firstly determines whether the current system supports the rapid data transmission mode according to the access system type, and if the current system supports the rapid data transmission mode, when the user equipment has a demand of service type data transmission, the user equipment firstly sends transmission mode request information and then transmits data according to the rapid data transmission mode after receiving feedback of configuration information related to the rapid data transmission mode; or if the user equipment determines that the current system only supports the rapid data transmission mode according to the access system type, data are transmitted according to the rapid data transmission mode in the system.

The embodiment of the present document further provides a data transmission system, at least including a transmission node, the transmission node is configured to acquire information about a data transmission mode and transmit data according to the acquired data transmission mode, herein the information about the data transmission mode includes a rapid data transmission mode, the rapid data transmission mode includes: configuring a time-domain length of data transmission based on a time-domain symbol.

The transmission node includes a sending node and/or a receiving node, and the sending node is configured to acquire information about a data transmission mode and transmit data according to the acquired data transmission mode; and the receiving node is configured to acquire the information about the data transmission mode and transmit data according to the acquired data transmission mode, herein the information about the data transmission mode includes a rapid data transmission mode, the rapid data transmission mode includes a time-domain length of data transmission configured based a time-domain symbol.

Therein, the sending node only supports the rapid data transmission mode.

When the sending node not only supports the rapid data transmission mode, but also supports a conventional data transmission mode, the sending node is further configured to determine whether the receiving node supports the rapid data transmission mode according to preset transmission information of the receiving node, and when determining that the receiving node supports the rapid data transmission mode, send the information about the data transmission mode to the receiving node to indicate that the data transmission mode of the receiving node is the rapid data transmission mode, herein the preset transmission information of the receiving node at least includes at least one of the following: transmission mode request information, device type information and service type information.

The receiving node is further configured to transmit data by using the rapid data transmission mode according to the indication of the sending node.

The sending node is further configured to, when determining that the receiving node does not support the rapid data transmission mode, determine that the receiving node transmits data according to the conventional data transmission mode; and correspondingly, the receiving node is further configured to transmit data by using the conventional data transmission mode according to the indication of the sending node.

The sending node is further configured to, when determining that the receiving node simultaneously supports the rapid data transmission mode and the conventional data transmission mode, set the receiving node to simultaneously support the rapid data transmission mode and the conventional data transmission mode; and correspondingly, the receiving node is further configured to perform data transmission in the rapid data transmission mode and/or the conventional data transmission mode according to the setting of the sending node.

The sending node includes, but not limited to, a base station, a relay transmission node, a wireless gateway or a router; and the receiving node includes, but not limited to user equipment, a micro base station or a home base station.

In another embodiment, the present document further provides data transmission software, which is used for executing the above-mentioned embodiments and the technical solutions described in the preferred embodiments.

In another embodiment, the present document further provides a storage medium, which stores the above-mentioned software and includes, but not limited to, an optical disk, a soft disk, a hard disk, an erasable memory, etc.

Obviously, one skilled in the art should understand that all modules and all steps in the present document may be implemented by using general-purpose computing devices, and they may be integrated in a single computing device or distributed on a network consisting of a plurality of computing devices. Alternatively they may be implemented by using program codes executable by computing devices, and thus they may be stored in memory devices and executed by computing devices, or they may be respectively manufactured into integrated circuit modules, or a plurality of modules or steps thereof may be manufactured into a single integrated circuit module to implement. Therefore, the present document is not limited to any specific combination of hardware and software.

What are described above are just preferred embodiments of the present document and are not used for limiting the protection range of the present document. Any modification, equivalent replacement, improvement and the like made within the spirit and principle of the present document shall be also included in the protection range of the present document.

The embodiments of the present document can reduce data transmission delay, satisfy transmission delay requirements under specific application scenarios and thus realize rapid data transmission.

INDUSTRIAL APPLICABILITY

The embodiments of the present invention can reduce data transmission delay, satisfy transmission delay requirements under specific application scenarios and thus realize rapid data transmission.

What is claimed is:

1. A data transmission method, comprising: a transmission node acquiring information about a data transmission mode, wherein the information about the data transmission mode comprises a rapid data transmission mode, and the rapid data transmission mode comprises: configuring a time-domain length of data transmission in each subframe based on a time-domain symbol, wherein the time-domain symbol at least comprises: an Orthogonal Frequency Division Multiplexing (OFDM) symbol, or a Single Carrier Frequency Division Multiple Access (SC-FDMA) symbol, or a non-orthogonal symbol, and configuring the time-domain length of data transmission in each subframe based on the time-domain symbol comprises: configuring the number of time-domain symbols contained in the time-domain length of data transmission in each subframe through signaling born by a control channel corresponding to a data channel, wherein the number of the time-domain symbols includes at least one of 1, 2, 3, 4, 8 and 10 and the numbers of time-domain symbols contained in the time-domain lengths of data transmissions in respective subframes are dynamically indicated by downlink control information; and the transmission node transmitting data according to the acquired data transmission mode.

2. The data transmission method according to claim 1, wherein the transmission node comprises a sending node and the sending node only supports the rapid data transmission mode.

3. The data transmission method according to claim 1, wherein the transmission node comprises a sending node and a receiving node, and when the sending node not only supports the rapid data transmission mode, but also supports a conventional data transmission mode, the method further comprises:

the sending node determining whether the receiving node uses the rapid data transmission mode; and when determining that the receiving node uses the rapid data transmission mode, sending the information about the data transmission mode to the receiving node to indicate that the data transmission mode of the receiving node is the rapid data transmission mode.

4. The data transmission method according to claim 3, wherein determining whether the receiving node uses the rapid data transmission mode comprises:

determining whether the receiving node uses the rapid data transmission mode according to preset transmission information of the receiving node.

5. The data transmission method according to claim 4, wherein the preset transmission information of the receiving node at least comprises at least one of the following: transmission mode request information, device type information and service type information.

6. The data transmission method according to claim 4, wherein determining whether the receiving node uses the rapid data transmission mode comprises:

if the sending node receives transmission mode request information from the receiving node, the sending node determining that the receiving node uses the rapid data transmission mode; or if the sending node determines that a type of the receiving node is a device supporting rapid data transmission according to device type information of the receiving node, the sending node determining that the receiving node uses the rapid data transmission mode; or if the sending node determines that a service type of the receiving node comprises an ultralow delay service and/or data demanded by a small resource block according to service type information of the receiving node, the sending node determining that the receiving node uses the rapid data transmission mode; or if the sending node determines that a receiving device is a device supporting rapid data transmission according to device type information of the receiving node and determines that the receiving device is of a service type using rapid data transmission according to a service type of the receiving device, the sending node determining that the receiving node uses the rapid data transmission mode.

7. The data transmission method according to claim 1, wherein the transmission node comprises a sending node and a receiving node, and if the sending node determines that the receiving node simultaneously uses the rapid data transmission mode and the conventional data transmission mode, the method further comprises: the sending node setting the receiving node to simultaneously use the rapid data transmission mode and the conventional data transmission mode.

8. The data transmission method according to claim 7, wherein the rapid data transmission mode and the conventional data transmission mode of the receiving node are located in different serving cells, or are located on different subframes of a same serving cell, or are located on different time-domain symbols of a same subframe of a same serving cell.

9. The data transmission method according to claim 8, wherein, when the receiving node simultaneously supports the rapid data transmission mode and the conventional data transmission mode, the method comprises at least one of the following:

a primary serving cell of the receiving node using the conventional data transmission mode, and a secondary serving cell of the receiving node using the rapid data transmission mode;

the primary serving cell of the receiving node using the conventional data transmission mode and a dedicated serving cell of the receiving node using the rapid data transmission mode; different subframe sets of a same serving cell of the receiving node using different transmission modes; and different time-domain symbols of a same subframe of a same serving cell of the receiving node using different transmission modes.

10. The data transmission method according to claim 1, wherein the transmission node comprises a sending node and a receiving node; and said acquiring information about a data transmission mode comprises:

an upper node in a transmission network sending the information about the data transmission mode to the sending node before the data transmission, and the sending node sending the information about the data transmission mode to the receiving node; or the sending node sending the information about the data transmission mode to the receiving node before the sending node sends data when the receiving node needs to perform data transmission; or the sending node sending the information about the data transmission mode in control information corresponding to data when the receiving node needs to perform data transmission; or dynamically determining the information about the data transmission mode according to data information which needs to be transmitted when data transmission is performed between the sending node and the receiving node.

11. The data transmission method according to claim 1, wherein the time-domain length comprises h time-domain symbols, wherein h is a preset numerical value, or a number of time-domain symbols contained in a time slot, or a number of time-domain symbols contained in a subframe, or a number of all or partial time-domain symbols contained in a plurality of subframes.

12. The data transmission method according to claim 11, wherein the number of the time-domain symbols for transmitting data in the time-domain length is preset; or the number of the time-domain symbols is dynamically determined according to data information which needs to be transmitted.

13. The data transmission method according to claim 1, wherein the data channel and the corresponding control channel of the data channel comprise: a downlink data channel and a corresponding downlink control channel of the downlink data channel, and/or an uplink data channel and a corresponding uplink control channel of the uplink data channel; and if the uplink data channel uses autonomous scheduling, the uplink control channel is used for indicating related transmission information of the corresponding data channel.

14. The data transmission method according to claim 1, wherein transmitting the data according to the data transmission mode comprises:

transmitting uplink data and a corresponding control channel of the uplink data according to the data transmission mode, and/or transmitting downlink data and a corresponding control channel of the downlink data according to the data transmission mode, wherein the uplink data are born through an uplink data channel, uplink control information is born through an uplink control channel and the transmission comprises sending and/or receiving.

15. The data transmission method according to claim 1, wherein the sending node comprises a base station, a relay transmission node, a wireless gateway or a router; and the receiving node comprises user equipment, a micro base station or a home base station.

16. The data transmission method according to claim 1, wherein a determining mode of a time-domain region of the time-domain symbols in the subframe is:

time-domain positions of time-domain symbols of the data channel are determined according to signaling born by the control channel corresponding to the data channel, and a time-domain starting position of time-domain symbols of the data channel is earlier or later than or the same as a time-domain starting position of time-domain symbols of the control channel; or a time-domain starting position of time-domain symbols of the data channel is set according to the time-domain length of the data channel, and a time-domain symbol region of the control channel is located at a preset position in a time-domain length region of the data channel.

17. The data transmission method according to claim 1, wherein in the rapid data transmission mode, there are two or more time-domain regions for data transmission in each subframe.

18. A sending node, configured to acquire information about a data transmission mode and transmit data according to the acquired data transmission mode, wherein the information about the data transmission mode comprises a rapid data transmission mode, and the rapid data transmission mode comprises: configuring a time-domain length of data transmission in each subframe based on a time-domain symbol, wherein the time-domain symbol at least comprises: an Orthogonal Frequency Division Multiplexing (OFDM) symbol, or a Single Carrier Frequency Division Multiple Access (SC-FDMA) symbol, or a non-orthogonal symbol, and configuring the time-domain length of data transmission in each subframe based on the time-domain symbol comprises: configuring the number of time-domain symbols contained in the time-domain length of data transmission in each subframe through signaling born by a control channel corresponding to a data channel, wherein the number of the time-domain symbols includes at least one of 1, 2, 3, 4, 8 and 10 and the numbers of time-domain symbols contained in the time-domain lengths of data transmissions in respective subframes are dynamically indicated by downlink control information.

19. The sending node according to claim 18, wherein the sending node only supports the rapid data transmission mode.

20. The sending node according to claim 18, wherein, when the sending node not only supports the rapid data transmission mode, but also supports a conventional data transmission mode, the sending node is further configured to determine whether a receiving node supports the rapid data transmission mode according to preset transmission information of the receiving node, and when determining that the receiving node uses the rapid data transmission mode, send the information about the data transmission mode to the receiving node to indicate that the data transmission mode of the receiving node is the rapid data transmission mode; and the preset transmission information of the receiving node at least comprises at least one of the following: transmission mode request information, device type information and service type information.

21. The sending node according to claim 20, wherein the sending node is further configured to, when determining that the receiving node does not support the rapid data transmission mode, determine that the receiving node transmits data according to the conventional data transmission mode.

22. The sending node according to claim 20, wherein the sending node is further configured to, when determining that the receiving node simultaneously supports the rapid data transmission mode and the conventional data transmission mode, set the receiving node to simultaneously support the rapid data transmission mode and the conventional data transmission mode.

23. The sending node according to claim 18, wherein the sending node comprises a base station, a relay transmission node, a wireless gateway or a router.

24. The sending node according to claim 18, wherein the time-domain length comprises h time-domain symbols, wherein h is a preset numerical value, or a number of time-domain symbols contained in a time slot, or a number of time-domain symbols contained in a subframe, or a number of all or partial time-domain symbols contained in a plurality of subframes.

25. The sending node according to claim 24, wherein the number of the time-domain symbols for transmitting data in the time-domain length is preset; or the number of the time-domain symbols is dynamically determined according to data information which needs to be transmitted.

26. The sending node according to claim 18, wherein the sending node is further configured to determine a time-domain region of the time-domain symbols in the subframe by means of:
time-domain positions of time-domain symbols of the data channel are determined according to signaling born by the control channel corresponding to the data channel, and a time-domain starting position of time-domain symbols of the data channel is earlier or later than or the same as a time-domain starting position of time-domain symbols of the control channel; or a time-domain starting position of time-domain symbols of the data channel is set according to the time-domain length of the data channel, and a time-domain symbol region of the control channel is located at a preset positions in a time-domain length region of the data channel.

27. The sending node according to claim 18, wherein in the rapid data transmission mode, there are two or more time-domain regions for data transmission in each subframe.

28. A receiving node, configured to acquire information about a data transmission mode; and transmit data according to the acquired data transmission mode,
wherein the information about the data transmission mode comprises a rapid data transmission mode, and the rapid data transmission mode comprises: configuring a time-domain length of data transmission in each subframe based on a time-domain symbol, wherein the time-domain symbol at least comprises: an Orthogonal Frequency Division Multiplexing (OFDM) symbol, or a Single Carrier Frequency Division Multiple Access (SC-FDMA) symbol, or a non-orthogonal symbol, and configuring the time-domain length of data transmission in each subframe based on the time-domain symbol comprises: configuring the number of time-domain symbols contained in the time-domain length of data transmission in each subframe through signaling born by a control channel corresponding to a data channel, wherein the number of the time-domain symbols includes at least one of 1, 2, 3, 4, 8 and 10 and the numbers of time-domain symbols contained in the time-domain lengths of data transmissions in respective subframes are dynamically indicated by downlink control information.

29. The receiving node according to claim 28, wherein the receiving node is further configured to transmit data by using the rapid data transmission mode and/or a conventional data transmission mode according to an indication of a sending node.

30. The receiving node according to claim 28, wherein the receiving node comprises user equipment, a micro base station or a home base station.

31. The receiving node according to claim 28, wherein the time-domain length comprises h time-domain symbols, wherein h is a preset numerical value, or a number of time-domain symbols contained in a time slot, or a number of time-domain symbols contained in a subframe, or a number of all or partial time-domain symbols contained in a plurality of subframes.

32. The receiving node according to claim 31, wherein the number of the time-domain symbols for transmitting data in the time-domain length is preset; or the number of the time-domain symbols is dynamically determined according to data information which needs to be transmitted.

33. The receiving node according to claim 28, wherein the receiving node is further configured to determine a time-domain region of the time-domain symbols in the subframe by means of:
time-domain positions of time-domain symbols of the data channel are determined according to signaling born by the control channel corresponding to the data channel, and a time-domain starting position of time-domain symbols of the data channel is earlier or later than or the same as a time-domain starting position of time-domain symbols of the control channel; or a time-domain starting position of time-domain symbols of the data channel is set according to the time-domain length of the data channel, and a time-domain symbol region of the control channel is located at a preset position in a time-domain length region of the data channel.

34. The receiving node according to claim 28, wherein in the rapid data transmission mode, there are two or more time-domain regions for data transmission in each subframe.

* * * * *